G. ZORGER.
Seed Planter.
No. 56,664.
Patented July 24, 1866.
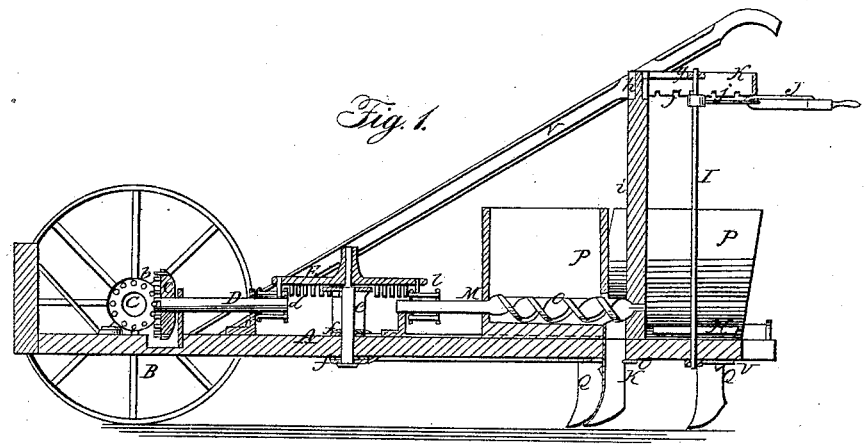
Fig. 1.
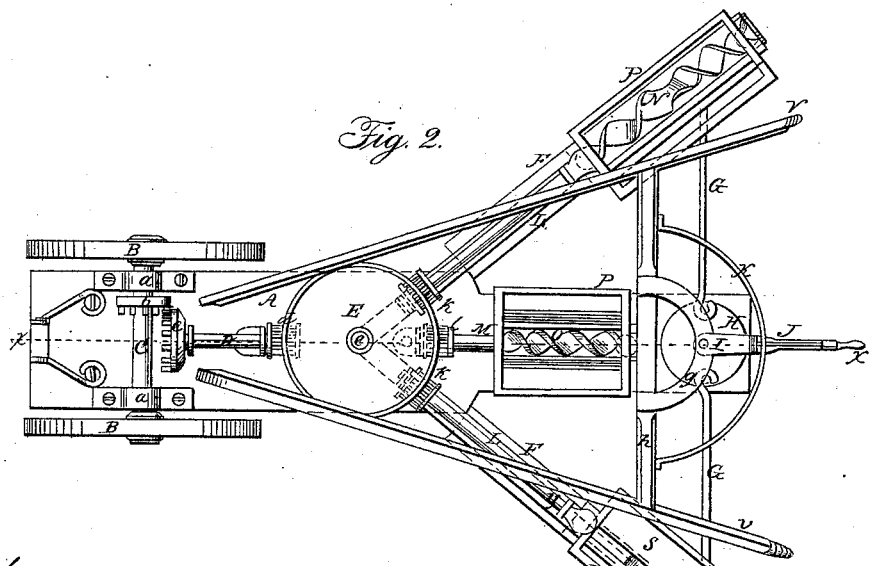
Fig. 2.
Fig. 4.
Fig. 3.
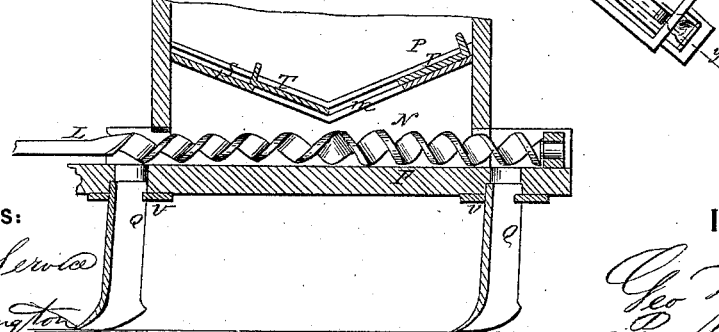
Witnesses:
Inventor:

UNITED STATES PATENT OFFICE.

GEO. ZORGER, OF GREENSBURG, INDIANA.

IMPROVEMENT IN WHEAT-DRILLS.

Specification forming part of Letters Patent No. 56,664, dated July 24, 1866.

*To all whom it may concern:*

Be it known that I, GEORGE ZORGER, of Greensburg, in the county of Decatur and State of Indiana, have invented a new and Improved Wheat-Drill; and I do hereby declare that the following is a full, clear, and exact description thereof, which will enable those skilled in the art to make and use the same, reference being had to the accompanying drawings, forming part of this specification, in which—

Figure 1 is a side sectional view of my invention, taken in the line $x\ x$, Fig. 2; Fig. 2, a plan or top view of the same; Fig. 3, a vertical section of a portion of the same, taken in the line $y\ y$, Fig. 2; Fig. 4, a detached inverted plan of the fastening used for securing the seed-conveying tubes in proper position.

Similar letters of reference indicate corresponding parts.

This invention relates to a new and useful improvement on a seed-drill or seeding-machine patented by Isaac B. Lutz, April 6, 1858.

The invention consists in certain modifications and peculiarities of construction, hereinafter fully shown and described, whereby it is believed several important advantages are obtained, which will be hereinafter set forth.

A represents a bar, the front part of which is supported by two wheels, B B, the axle C of which is fitted in suitable bearings $a\ a$ on the bar A. On the axle C there is keyed a toothed wheel, $b$, which gears into a corresponding wheel, $c$, on a shaft, D, the bearings of which are on the top of bar A, the shaft D having a longitudinal position thereon. On the rear end of shaft D there is keyed a pinion, $d$, which gears into a horizontal wheel, E, the axis or arbor $e$ of which passes vertically through the bar A.

F F are two arms, placed one at each side of the bar A and secured thereto by metal straps $f\ f$, through which the axis or arbor $e$ of the wheel E passes. The arms F F, being thus secured to the bar A, are rendered capable of being adjusted nearer to or farther from the bar A as occasion may require, and this adjustment is effected by means of rods G G, the outer ends of which are attached to the outer or rear ends of the arms F, and the inner ends connected to a horizontal wheel, H, at opposite sides of its shaft I. (See Fig. 2.) The shaft I has its lower end fitted in the rear part of bar A, the upper end of said shaft having its bearing in a semicircular bar, $g$, attached to a cross-bar, $h$, on the upper end of upright $i$ on the rear end of bar A.

To the upper end of the shaft I there is attached a handle or lever, J, which has a certain degree of elasticity in a vertical direction, and K is a semicircular bar attached to the cross-bar $h$, and having notches $j$ in its under side to receive the lever J, the elasticity of the lever having a tendency to keep it in the notches $j$.

From the above description it will be seen that by turning the shaft I the wheel H will be turned and the arms F F adjusted toward or from the bar A, as desired, and the arms held at the desired point in consequence of the lever J engaging with a notch, $j$, in bar K.

On each arm F there is a longitudinal shaft, L, which have pinions $k$ on their front ends, said pinions gearing into the wheel E. A shaft, M, is also placed longitudinally on the rear part of bar A, and has a pinion, $l$, on its front end which gears into wheel E. The shafts L have each a right-and-left screw, N, formed on their rear parts, and the shaft M has a screw, O, formed on it, the thread of which is not reversed, and over each of these screws a seed-hopper, P, is placed. The screws N convey the seed to the front and rear ends of the hoppers in which they work, and cause the seed to be discharged from the front and rear ends of the same, the seed passing down through suitable tubes Q, fitted in the arms F. The screw O discharges the seed from the rear end of its hopper through a tube, R. The screws are all rotated from the axle of the wheels B B through the medium of the gearing described.

The means for distributing the seed is the same as that employed by Lutz in the patented machine previously alluded to; but the device I use for adjusting the arms F F is entirely different, and is a decided improvement on account of the facility with which the arms may be moved and secured at the desired point. The device also may be made considerably shorter, and therefore rendered capable of being turned within a smaller compass, than the original machine. The two wheels B B at the front end of bar A is also an improvement, as the draft is central, and the parts work smoother, and there is a total absence of side draft.

In each hopper P, just above its screw, there is fitted a double inclined plate, S, (see Fig. 3,) said plates being slotted longitudinally, as shown at *m*, and provided with slides T T, by adjusting which more or less seed may be admitted to the screws and a greater or less amount of seed sown over a given area, as required. This also is an improvement, the original machine having nothing for the purpose.

The seed-conveying tubes Q R pass through slots in metal plates U, secured to the under sides of the arms F F and bar A. (See Figs. 3 and 4.) These plates U effectually prevent tth tubes from turning out of proper position—a contingency of frequent occurrence with the patented machine previously alluded to.

The device is supplied with handles V, attached to bar A and the cross-bar *h*.

Having thus described my invention, I claim as new and desire to secure by Letters Patent—

1. The means employed for adjusting the arms F F—to wit, the rods G G, attached at their outer ends to the rear ends of the arms E, and connected at their inner ends to opposite sides of a wheel, H, on a vertical shaft, I, which has an elastic handle or lever, J, attached to it, engaging with a notched semicircular bar, K, substantially as shown and described.

2. The two wheels B B, supporting the front end of the bar A, in combination with the gearing *b c d* E *l k k*, all arranged as shown and described, for rotating the screws N N O, as set forth.

3. The slotted plates S in the hoppers P, provided with the slides T, for the purpose of regulating the flow or discharge of the seed, as described.

4. The securing in proper position of the seed-conveying spouts Q Q R to the arms F F and bar A by means of the slotted plates U, substantially as shown and described.

GEORGE ZORGER.

Witnesses:
E. R. MINEAR,
L. D. ROBINSON.